United States Patent [19]

Oda et al.

[11] Patent Number: 4,790,795
[45] Date of Patent: Dec. 13, 1988

[54] CONNECTION CONSTRUCTION OF TURNING ANGLE DETECTOR

[75] Inventors: Yukihisa Oda, Chiryu; Keiji Yasuda, Handa; Shigemitsu Hamajima, Obu, all of Japan

[73] Assignee: Aisin Seiki Kabushiki Kaisha, Kariya, Japan

[21] Appl. No.: 124,441

[22] Filed: Nov. 23, 1987

Related U.S. Application Data

[63] Continuation of Ser. No. 844,493, Mar. 26, 1986, abandoned.

[30] Foreign Application Priority Data

Mar. 26, 1985 [JP] Japan ................................ 60-043687

[51] Int. Cl.$^4$ .............................................. F16D 3/04
[52] U.S. Cl. ....................................... 464/102; 464/138
[58] Field of Search ................. 403/335, 337; 464/102, 464/137, 138, 185

[56] References Cited

U.S. PATENT DOCUMENTS

| | | | |
|---|---|---|---|
| 2,292,675 | 8/1942 | Thiry | 464/138 X |
| 2,909,046 | 10/1959 | Wheeler | 464/137 |
| 3,117,431 | 1/1964 | MacFarlane | 464/138 |

FOREIGN PATENT DOCUMENTS

| | | | |
|---|---|---|---|
| 721577 | 6/1942 | Fed. Rep. of Germany | 464/138 |
| 2408515 | 9/1974 | Fed. Rep. of Germany | 464/137 |
| 2493534 | 5/1982 | France | 464/137 |
| 623640 | 6/1981 | Switzerland | 464/138 |
| 530122 | 9/1976 | U.S.S.R. | 464/138 |
| 926399 | 5/1982 | U.S.S.R. | 464/102 |
| 659302 | 10/1951 | United Kingdom | 464/137 |

Primary Examiner—Daniel P. Stodola
Attorney, Agent, or Firm—Sughrue, Mion, Zinn, Macpeak and Seas

[57] ABSTRACT

A connection construction of a turning angle detector which comprises a lever in the form of a large-diameter member secured to a shaft to be detected and extending in the radial direction of the shaft to be detected, a pin secured at right angles to the lever, a connection shaft projecting outward from a boss portion of the turning angle detector and having a large-diameter portion larger than the diameter of the boss portion, and a pinching portion for pinching the pin in the large-diameter portion of the connection shaft so that the pin is movable in the radial direction and axial direction within its pinched range, but its movement in the circumferential direction is restricted, wherein the rotation of the shaft to be detected is transmitted to the connection shaft of the turning angle detector, whereby an error arising at the time of assembly can be absorbed by the space between the pinching portion and the pin to make easy the process of assembly, and it is possible to configure mutually tightly the connection shaft and the boss portion for supporting rotatably the connection shaft; thus, infiltration of water and the like can be prevented.

5 Claims, 5 Drawing Sheets

(a)

(b)

(a)

(b)

(a)

(b)

CONNECTION CONSTRUCTION OF TURNING ANGLE DETECTOR

This is a continuation of application Ser. No. 844,493, filed 3/26/86, now abandoned.

BACKGROUND OF THE INVENTION

1. Field of the Invention

This invention relates to a connection construction of a turning angle detector for detecting a turning angle and, more particularly, to a connection construction of connecting mutually the shaft of a body to be detected with the shaft of a potentiometer, rotary switch, code plate, etc. accommodated in the turning angle detector, which will be incorporated in mounting, for example, a throttle opening-degree detector for detecting the degree of opening of a throttle valve.

2. Description of the Prior Art

An example of conventional turning angle detectors of the above kind is disclosed in Japanese Utility Model Laid-Open No. 57-99109 which concerns the technique of throttle opening-degree detector.

The aforementioned technique will be described with reference to the sectional view of FIG. 6 showing one conventional throttle opening-degree detector.

The conventional throttle opening-degree detector comprises a holder 33 having a brush 32 which turns along a pre-determined locus inside a case 31 with interlocked relation to a throttle valve shaft 34, a potentiometer composed of a resistor body 35 disposed so as to contact slidingly with the brush 32 on the turning locus of the brush 32 which generates an electrical continuous signal in response to the turning angle of the throttle valve shaft 34, a sleeve 37 secured to the case 31 concentrically with the rotary shaft of the brush 32, and a joint 36 which is coupled with the holder 33 so as to restrict the movement in the circumferential direction of the holder 33 while making free the movement in the radial direction thereof, fits loosely in the sleeve 37 so as to leave a gap 39 therebetween spreading in the radial direction, and transmits the rotation of the throttle valve shaft 34 to the brush 32 forming the potentiometer.

To integralize the holder 33 and sleeve 37 the holder 33 has a metallic bearing portion 33a. The connection between the holder 33 and joint 36 is designed so that an arm 36a of the joint 36 is pinched by a strut portion 33b of the holder 33 so as to prevent the difference in movement of the circumferential direction from appearing therebetween.

Accordingly, as the throttle valve shaft 34 turns, the joint 36 turns and the arm 36a moves the strut portion 33b pinching that arm in the circumferential direction. As a result, the holder 33 turns and the brush 32 forming the potentiometer is slid. Thus, by means of the output of the potentiometer the turning angle of the throttle valve shaft 34 can be detected.

The throttle opening-degree detector of the foregoing kind has the gap 39 between the sleeve 37 secured to the case 31 and the joint 36 secured to the point of the throttle valve shaft 34, and this gap 39 absorbs a mounting error arising at the time of mounting the throttle opening-degree detector to a throttle body, strain of the throttle valve shaft 34, and the like.

However, the respiration action of the gap 39 is promoted owing to a change in temperature of the throttle body and like parts, whereby water tends to infiltrate into the throttle opening-degree detector. If water infiltrated adheres to the brush 32 or resistor body 35 forming the potentiometer, the output value of the potentiometer is influenced, metallic parts and the like inside the throttle opening-degree detector are corroded, and the lifetime of the throttle opening-degree detector is shortened.

SUMMARY OF THE INVENTION

It is an object of the present invention to obviate the foregoing problems, thus to provide a connection construction of a turning angle detector which makes hard infiltration of water thereinto, is easy to mount to a shaft to be detected, and can absorb the mounting error and the like.

To achieve the foregoing object, the present invention provides a connection construction of a turning angle detector, which comprises a lever in the form of a large-diameter member secured to a shaft to be detected and extending in the radial direction of the shaft to be detected, a pin secured at right angles to the lever, a connection shaft projecting outward from a boss portion of the turning angle detector and having a large-diameter portion larger than the diameter of the boss portion, and a pinching portion for pinching the pin in the large-diameter portion of the connection shaft so that the pin is movable in the radial direction and axial direction within its pinched range, but its movement in the circumstances direction is restricted, wherein the rotation of the shaft to be detected is transmitted to the connection shaft of the turning angle detector.

Functionally, by pinching the pin erected on the lever secured to the shaft to be detected by means of the pinching portion of the connection shaft of the turning angle detector, the connection shaft of the turning angle detector is arranged substantially concentrically with the shaft to be detected. Thus, an error appearing in the axial direction between the shaft to be detected and the connection shaft of the turning angle detector can be absorbed through sliding in the axial direction of the pin and connection shaft within the range of the pin being pinched by the pinching portion. An error appearing between the axial centers of both the shafts can be absorbed through sliding in the radial direction of the pin and connection shaft within the range of the pin being pinched by the pinching portion. Because the connection shaft restricts the movement in the circumferential direction of the pin, the rotation of the shaft to be detected is converted to the rotation of the large-diameter portion by means of the pin secured to the lever and in turn converted to the rotation of the connection shaft.

Therefore, an error arising at the time of assembly can be absorbed by the space between the pinching portion of the connection shaft projecting from the turning angle detector and the pin attached to the shaft to be detected to make easy the process of assembly, and it is possible to configure mutually tightly the connection shaft of the turning angle detector and the boss portion for supporting rotatably the connection shaft; thus, infiltration of water and the like can be prevented.

DESCRIPTION OF THE PREFERRED EMBODIMENTS

Figure 1:
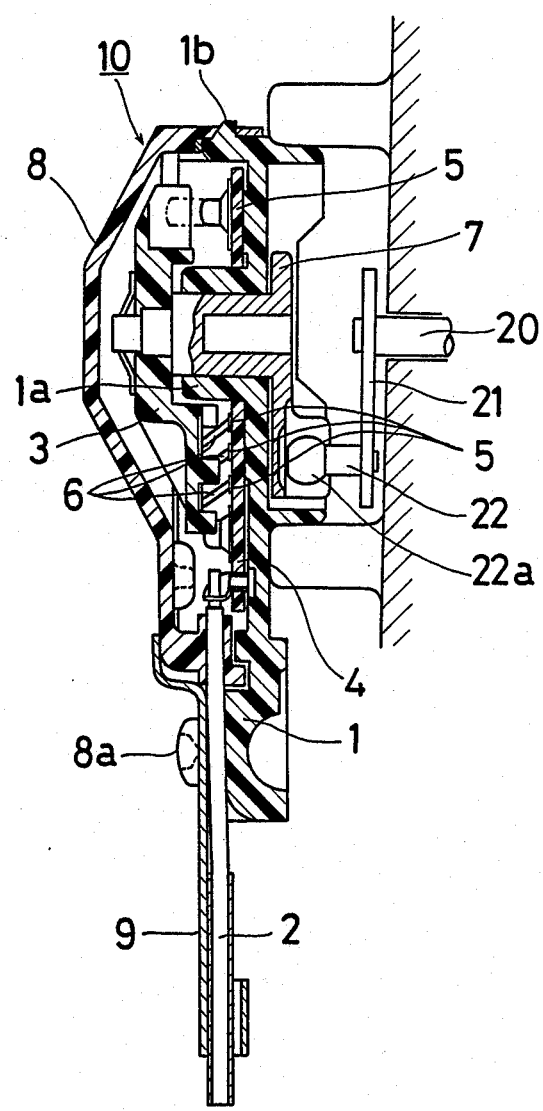
FIG. 1 is a sectional view of an embodiment of a connection construction of a turning angle detector according to the present invention, taken along line X—X of FIG. 2.
Figure 2:
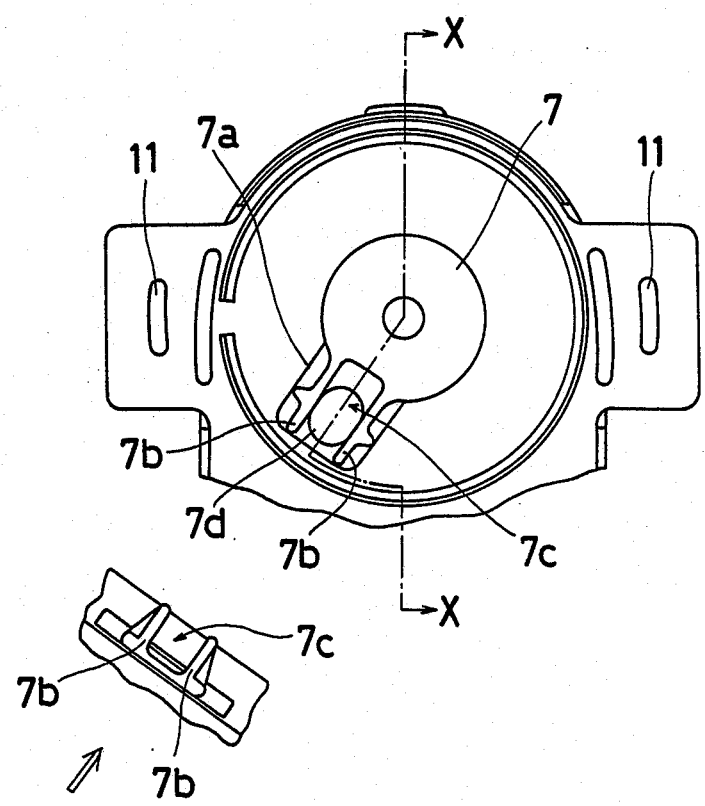
FIG. 2 is a bottom and plan view of an important portion of the connection construction of the turning angle detector.

Embodiments of the present invention will now be described with reference to the drawings, in which FIG. 1 is a sectional view showing an embodiment of a turning angle detector according to the present invention, taken along line X—X of FIG. 2, and FIG. 2 is a bottom and plan view of an important portion, viewed from the side of a connection shaft of the turning angle detector.

A turning angle detector 10 is composed of a potentiometer accommodated in between a case 1 and its cover 8. Although in the embodiment illustrated the detecting means of the turning angle detector 10 will be described hereinafter as being the potentiometer accommodated therein, the detecting means accommodated in the turning angle detector 10 is not necessarily limited to the potentiometer, otherwise, these which change their outputs in response to rotation of a shaft may be incorporated, such as rotary switch, code plate, variable condenser, and variable reactor. The case 1 and cover 8 are engaged together by means of a convex portion 1$b$ of the case 1, and sealed by means of a lead wire guide 9 secured onto the case 1 by a screw 8$a$.

On the case 1 of the turning angle detector 10 is disposed a circuit substrate 4 having a resistor body 5 on its surface, and a brush 6 contacting with the resistor body 5 is mounted on a brush holding member 3. The brush holding member 3 is secured by a push nut and the like to a connection on input shaft 7 fitted rotatably in a boss portion 1$a$ of the case 1. Therefore, the brush holding member 3 holding fixedly the brush 6 serving as a slider is rotatable with respect to the case 1.

The resistor body 5 and brush 6 are connected to lead wires 2, and the position of the contact point between the brush 6 and resistor body 5 is detected by means of a change of resistance obtained through the lead wires 2.

In case the turning angle detector 10 of the foregoing kind is used as a throttle opening-degree detector for detecting the degree of opening of a throttle valve, a throttle valve shaft 20 which is a shaft to be detected and the connection shaft 7 projecting from the turning angle detector 10 are jointed together. At this time, by the use of mounting holes 11 of the turning angle detector 10 the throttle valve shaft 20 and connection shaft 7 are assembled together so as to assume a substantially concentrical relation.

Specifically, the throttle valve shaft 20 has a lever 21 which is a large-diameter member extending in the radial direction of the throttle valve shaft 20, and this lever 21 has a pin 22 erected thereon in the direction perpendicular to the lever 21, i.e. in the axial direction of the throttle valve shaft 20. The pin 22 has in its point section preferably a substantially globe-like spherical portion 22$a$, or a substantially column-like cylindrical portion ( not shown ).

The connection shaft 7 of the turning angle detector 10 coming into engagement with the spherical portion 22$a$ is configured as shown in FIG. 2.

The connection shaft 7 has a large-diameter portion 7$a$ which is larger in diameter than the boss portion 1$a$ of the turning angle detector 10, the large-diameter portion 7$a$ has a pair of pinching segments 7$b$ whose surfaces are parallel mutually and to the radial direction thereof, and a fitting concave portion 7$d$ indented in the axial direction of the connection shaft 7 is formed between the pair of pinching segments 7$b$.

The connection between the throttle valve shaft 20 and the connection shaft 7 is achieved if the spherical portion 22$a$ of the pin 22 erected on the lever 21 extending in the radial direction of the throttle valve shaft 20 is pinched in a pinching portion 7$c$ of the large-diameter portion 7$a$ of the connection shaft 7 by the pair of pinching segments 7$b$.

Consequently, the spherical portion 22$a$ is pinched by the pinching segments 7$b$, and its slidable range in the radial direction means an extent within which a discrepancy of axial center between the throttle valve shaft 20 which is the shaft to be detected and the connection shaft 7 of the turning angle detector 10 can be absorbed. Further, the spherical portion 22$a$ is pinched by means of the depth of the fitting concave portion 7$d$ and the height of the pinching segments 7$b$, and its slidable range in the axial direction means an extent within which a discrepancy in the relative axial direction between the throttle valve shaft 20 which is the shaft to be detected and the connection shaft 7 of the turning angle detector 10 can be absorbed.

As is apparent from the embodiment shown in FIGS. 1 and 2, because the spherical portion 22$a$ of the pin 22 is slidable in the radial direction and axial direction owing to the pinching portion 7$c$, the mounting error in the radial direction and axial direction, strain of the shafts, etc. can be absorbed, and because sliding of the shafts in the circumferential direction is restricted by the pinching segments 7$b$, the rotation of the shaft to be detected is transmitted to the connection shaft 7 of the turning angle detector 10.

The connection shaft 7 of the turning angle detector 10 of the foregoing embodiment can be modified as will be desribed below.

Figure 3:
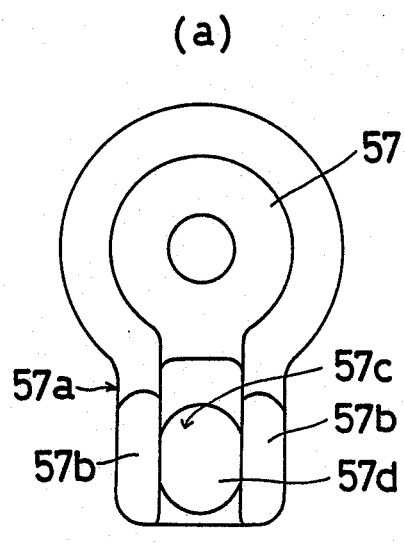
FIGS. 3, 4 ad 5 are plan (a) and front (b) views showing modifications of a connection shaft incorporatable in practicing the present invention.
Figure 3:
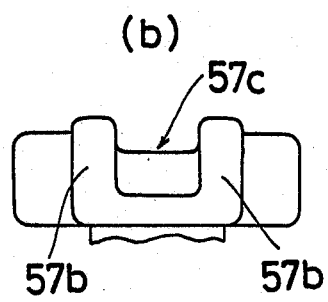
Figure 4:
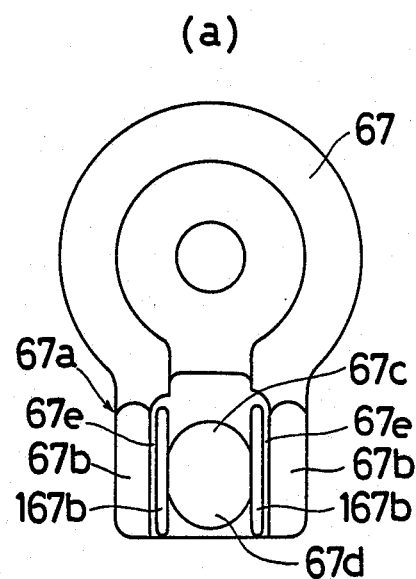
Figure 4:
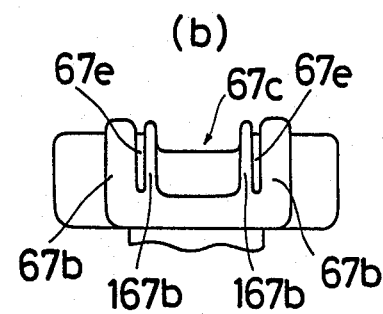
Figure 5:
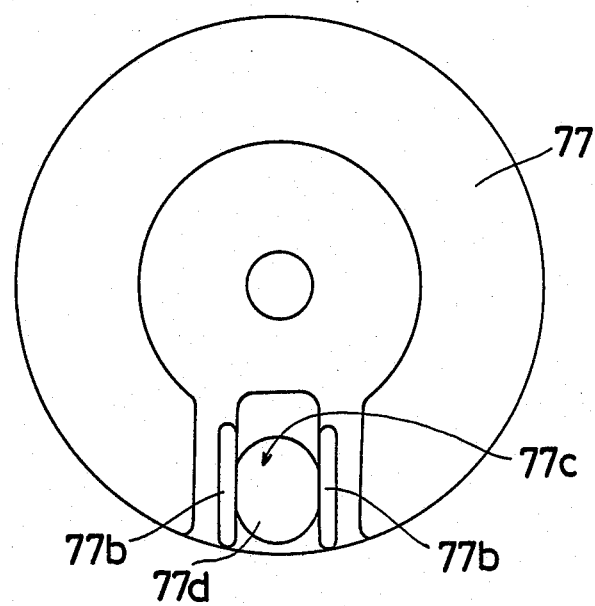
Figure 5:
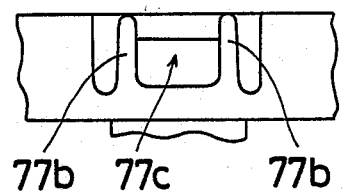
Figure 6:
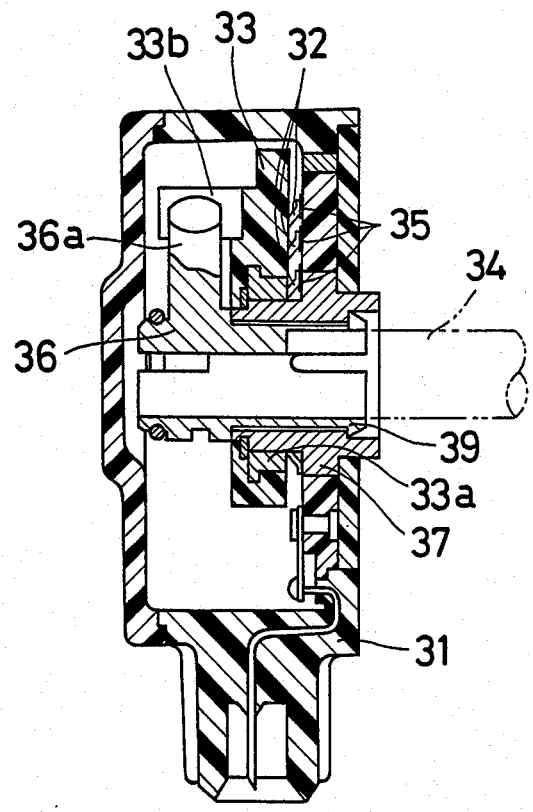
FIG. 6 is a sectional view showing the conventional throttle opening-degree detector.

FIGS. 3, 4 and 5 are plan (a) and front (b) views showing the important portions of modifications of the connection shaft according to the present invention.

Describing the different points from the connection shaft 7 of the embodiment shown in FIGS. 1 and 2, different from the pinching segments 7$b$ forming the pinching portion 7$c$ shown in FIG. 2 which are reinforced by ribs provided in a substantially center portion thereof, a connection shaft 57 of FIG. 3 is modified so that pinching segments 57$b$ forming a pinching portion 57$c$ is thickened to withstand the force of rotation to be transmitted. Incidentally, a large-diameter portion 57$a$ and fitting concave portion 57$d$ of FIG. 3 correspond to the large-diameter portion 7$a$ and fitting concave portion 7$d$ of FIG. 2.

A connection shaft 67 of FIG. 4 has, inside a pair of pinching segments 67$b$ forming a pinching portion 67$c$, another pair of elastic pinching segments 167$b$ formed in parallel with the pair of pinching segments 67$b$. Thus, within the range of each space portion 67$e$ the elastic pinching segment 167$b$ engages elastically with the spherical portion of the pin 22. Incidentally, a large-diameter portion 67$a$ and fitting concave portion 67$d$ of FIG. 4 correspond to the large-diameter portion 7a and fitting concave portion 7d of FIG. 2.

A connection shaft 77 of FIG. 5 is modified so that a portion of the connection shaft 77 projecting from the turning angle detector 10 is made larger than the diameter of the boss portion 1a, namely, made identical in diameter to the large-diameter portions shown in FIGS. 2, 3 and 4. Further, each pinching segment 77b has an appropriate elasticity to form a pinching portion 77c. Incidentally, a fitting concave portion 77d corresponds to the fitting concave portion 7d of FIG. 2.

Although the modifications of the connection shaft of the turning angle detector 10 are described with reference to FIGS. 2 through 5, the essential matter of the connection shaft of the turning angle detector 10 of the embodiments is that it has the pinching portion for pinching the spherical portion 22a of the pin 22 erected on the lever 21 which is the large-diameter portion extending in the radial direction of the throttle valve shaft 20 which is the shaft to be detected. Obviously, the pinching portion functions so as to permit sliding of the connection shaft in the radial direction and axial direction ( the direction parallel to the shaft ), but restricts its movement in the circumferential direction.

Therefore, other than the modification shown in Figs. 2 through 5, the pinching portion can be modified further into one having no fitting concave portion 7d, 57d, 67d, or 77d, or another which will be configured only by forming a notch in a large-diameter portion, such as the connection shaft 77 shown in FIG. 5, these modifications can also be incorporated similarly to the foregoing embodiments.

The lever 21 which is the large-diameter member extending in the radial direction of the throttle valve shaft 20 which is the shaft to be detected is intended to reduce the error of turning angle arising as the result of shaft engagement, and the pin 22 should be erected on a large-diameter position, compared with the diameter of the throttle valve shaft 20; thus, at the time of practicing the present invention,the lever 21 is not necessarily essential and a large-diameter member of disc shape may be incorporated.

The pin 22 erected on the lever 21 has on its point the spherical portion 22a and this spherical portion 22a transmits the rotation of the shaft to be detected to the connection shaft 7 through point contact between it and the pinching segment 7b, 57b, 167b, or 77b. If line contact is desired,this will be achieved by the use of the pin 22 of column shape or by making a portion of the pin coming into contact with the pinching segments into the form of a column. However, depending upon the state of the contact, the larger the discrepancy between the connection shafts, the more the error arises in the turning angle detector owing to its contact resistance. Therefore, the pin 22 having the spherical portion 22a shown in FIG. 1 is best suited.

Although in the embodiments of the present invention the pinching portion is provided on the connection shaft of the turning angle detector, the pinching portion may be formed on the side of the shaft to be detected while providing the lever ( disc ) with the pin erected thereon on the side of the turning angle detector.

According to the foregoing embodiments, there is no need to provide a gap in the rotary shaft for absorbing an error arising at the time of assembling the detecting means of the turning angle detector, and such an error can be absorbed on the outside of the turning angle detector; thus, it is possible to cause the shaft projecting from the turning angle detector and the boss portion to contact tightly together, whereby a high-waterproof construction can be provided.

As described hereinabove, according to the present invention, the pin secured at right angles on the large-diameter member secured to the shaft from which its turning angle is to be detected and extending in its radial direction is pinched by the pinching portion formed on the connection shaft having the large-diameter portion larger than the diameter of the boss portion of the turning angle detector and projecting outward from the boss portion, and within its pinched range the pin is permitted to slide in the radial direction and axial direction, but its sliding in the circumferential direction is restricted; thus, the connection shaft and the boss portion of the turning angle detector can contact tightly together and water can hardly infiltrate into the turning angle detector. Because the sliding in the radial direction and axial direction is permitted, the mounting error and the like between the turning angle detector and the shaft to be detected can be absorbed, so that the present construction can easily be attached to the shaft to be detected.

What is claimed is:

1. A connection construction for connecting an input shaft of a turning angle detector with a valve shaft whose turning angle is to be detected by said detector comprising:
    a lever member secured to said valve shaft and extending radially outwardly from the longitudinal axis of said valve shaft,
    a pin member provided at one end of said lever member and extending therefrom in the opposite direction relative to said valve shaft,
    a spherical member provided on the end of said pin member,
    a projection portion provided at one end, positioned outside said detector, of said input shaft and projecting in the radial direction from the axis of said input shaft, and
    pinching means provided on said projection portion and containing said spherical member,
    wherein said pinching means permits said spherical member to move in the radial direction and the axial direction with respect to the axis of said input shaft and prevents movement of the spherical member in the circumferential direction thereof relative to said pinching means, and
    wherein said pinching means comprises a concave portion formed in said projection portion between two pinching segments extending from said projection portion, wherein said pinching segments are disposed in a parallel relationship and have flat inner-sidewalls, and said spherical member is received by said concave portion and contained by said flat inner-sidewalls of said pinching segments.

2. A connection construction according to claim 1, wherein each pinching segment has a rib at its substantially center portion on its outer-sidewalls.

3. A connection construction according to claim 1, wherein each pinching segment has a comparatively large thickness.

4. A connection construction according to claim 1, including further elastic pinching segments positioned inside said pinching segments in parallel therewith.

5. A connection construction according to claim 1, wherein said projection portion extends from said one end of said input shaft over an entire circumference of said input shaft, and said pinching segments are defined by a radially extending recess provided in a peripheral portion of said projection portion for receiving said spherical member and a pair of grooves extending in parallel spaced relation to said recess on opposite sides thereof.

* * * * *